United States Patent [19]
Rawls

[11] Patent Number: 6,026,609
[45] Date of Patent: Feb. 22, 2000

[54] HOT STEAM AND WATER FIRE ANT KILLING DEVICE

[76] Inventor: Hugh Miller Rawls, 2995 Russ St., Marianna, Fla. 32446

[21] Appl. No.: 09/062,988

[22] Filed: Apr. 20, 1998

[51] Int. Cl.[7] .................................................. A01M 1/20
[52] U.S. Cl. ............................................ 43/124; 43/132.1
[58] Field of Search ..................................... 43/124, 132.1

[56] References Cited

U.S. PATENT DOCUMENTS

| | | | |
|---|---|---|---|
| 3,540,837 | 11/1970 | Pascucci | 43/124 |
| 3,886,874 | 6/1975 | Platz | 111/7.4 |
| 4,815,234 | 3/1989 | Connolly | 43/132.1 |
| 5,319,878 | 6/1994 | Moffett et al. | 43/124 |
| 5,366,154 | 11/1994 | Thompson | 239/13 |
| 5,427,507 | 6/1995 | Whitehead | 417/344 |
| 5,682,829 | 11/1997 | Sukup | 111/121 |

FOREIGN PATENT DOCUMENTS

| | | | |
|---|---|---|---|
| 5-15289 | 1/1993 | Japan | 43/124 |

*Primary Examiner*—Michael J. Carone
*Assistant Examiner*—Son T. Nguyen
*Attorney, Agent, or Firm*—John Wiley Horton

[57] ABSTRACT

A mechanical device for killing fire ants by the introduction of hot water and steam to the fire ant mound. The invention uses a hydraulic cylinder to ram a metal probe deep into an ant mound. The probe has a plurality of orifices which emit jets of hot water and steam, thereby scalding and killing the ant queen before she can be removed to safety. In the preferred embodiment, the invention is adapted to be mounted on an agricultural tractor.

7 Claims, 7 Drawing Sheets

HOT STEAM AND WATER FIRE ANT KILLING DEVICE

BACKGROUND—FIELD OF INVENTION

This invention relates to the destruction of imported fire ants of the genus solenopsis, and specifically to a apparatus which destroys the ants using steam and/or hot water.

BACKGROUND—DESCRIPTION OF THE PRIOR ART

The South American fire ant has been a problem in the United States since the early part of this century. It has been tremendously successful in expanding its habitat at the expense of other indigenous ants. The fire ant's success is largely due to the following documented characteristics: (1) Any disturbance of the fire ant mound will cause the colony to attack the intruder in mass; (2) Any disturbance sufficient to destroy the mound will cause the ants to rapidly transport the queen to safety through a series of underground tunnels extending outwards for as much as 75 feet; and (3) So long as the queen and a few thousand ants survive the attack, a new mound may rapidly be established. Thus, the reader will appreciate that the only way to destroy a colony is to attack the queen with sufficient stealth and rapidity to prevent the other ants from carrying her to safety.

Various methods have been employed to reach and rapidly kill an ant colony's queen. One known technique is to insert a probe into the mound and inject vaporized insecticides, as shown in the U.S. Pat. No. 4,756,118 to Evans (1988). Another method is to flood the mound with insecticides dissolved in water, as shown in U.S. Pat. No. 5,054,231 to Witherspoon (1991). Both these methods require the user to get very close to the mound, making the user vulnerable to attack by the ants. Additionally, as both techniques depend on the user manually thrusting the probe into the mound, there is a limit on how deep the probe can go. Some ant colonies bury the queen three or more feet below ground level, meaning that the methods shown in the '118 and '231 patents may have difficulty destroying the queen before she can be removed.

A third technique is illustrated by U.S. Pat. No. 5,031,355 to Ryan (1991). Ryan uses a dome clamped over the mound, into which superheated steam is forced by pressure. Unfortunately, the '355 device requires the user to place the dome over the mound and then stake it to the ground. Like the '118 and '231 devices, the user must get very close to the mound and risk attack by the ants. In addition, the vibrations caused by placing the dome on the ground and hammering in the retaining spikes are likely to alert the ants and cause them to remove the queen.

The known methods for eradicating the South American fire ant are therefore limited in that they: (1) Require the operator to get very close to the mound, thereby risking attack; (2) Cannot penetrate very deeply into the mound, possibly preventing them from reaching the queen; and (3) Are fairly slow to operate, thereby giving the colony time to remove the queen.

OBJECT AND ADVANTAGES

Accordingly, several objects and advantages of the present invention are:

(1) to mount the device on an agricultural tractor or other vehicle so that the operator does not have to approach the ant mound on foot;

(2) to mount the device on an agricultural tractor or other vehicle in order to make it easily portable;

(3) to make the mounting, dismounting, and storage of the device fairly simple so that it may be easily removed from the vehicle when not in use;

(4) to insert a probe into an ant mound using the force of a hydraulic cylinder, whereby a large probe may be thrust three or more feet below the ground level for the delivery of steam and/or hot water;

(5) to allow a rapid approach and destroy cycle, thereby minimizing warning to the ants;

(6) to kill the queen of the ant colony, and as many of the other ants as possible in a short period of time.

These objects and advantages will be fully explained in the details hereafter described, explained, and claimed, with reference being made to the accompanying drawings.

REFERENCE NUMERALS IN DRAWINGS

| | |
|---|---|
| 10 | steam generator |
| 12 | fuel tank |
| 14 | mounting frame |
| 16 | floor plate |
| 18 | fuel tank strap |
| 20 | steam generator mount |
| 22 | hydraulic cylinder |
| 24 | cylinder rod |
| 26 | dome |
| 28 | probe |
| 30 | steam/water orifice |
| 32 | steam shroud |
| 34 | fuel supply line |
| 36 | water inlet |
| 38 | pump outlet tube |
| 40 | hydraulic line |
| 42 | rear tractor wheel |
| 44 | probe coupling |
| 46 | cylinder mounting bracket |
| 48 | control lever |
| 50 | water tank |
| 52 | pump |
| 54 | top link bracket |
| 56 | lift pin |
| 58 | water feed tube |
| 60 | pump inlet tube |
| 62 | central cavity |
| 64 | cylinder support arm |
| 66 | trip valve |
| 68 | water/steam inlet |
| 70 | hinge |
| 72 | latch |
| 74 | tractor |

-continued

| | |
|---|---|
| 76 | lift arm |
| 78 | top link |
| 80 | lift arm hole |
| 82 | top link hole |
| 84 | cross pin |
| 86 | dome bolt |
| 88 | PTO shaft |
| 90 | pump input shaft |
| 92 | fuel line |
| 94 | valve |
| 96 | ant mound |
| 98 | cylinder input valve |
| 100 | cylinder opening |
| 102 | alternate coupling |
| 104 | piston |
| 106 | cylinder output tube |
| 108 | check valve |
| 110 | shut-off valve |
| 112 | trip bracket |
| 114 | pump cylinder |
| 116 | tee coupling |
| 118 | front wheel |
| 120 | hot water |
| 122 | front bracket |

DESCRIPTION—FIGS. 1 to 7

Figure 1:
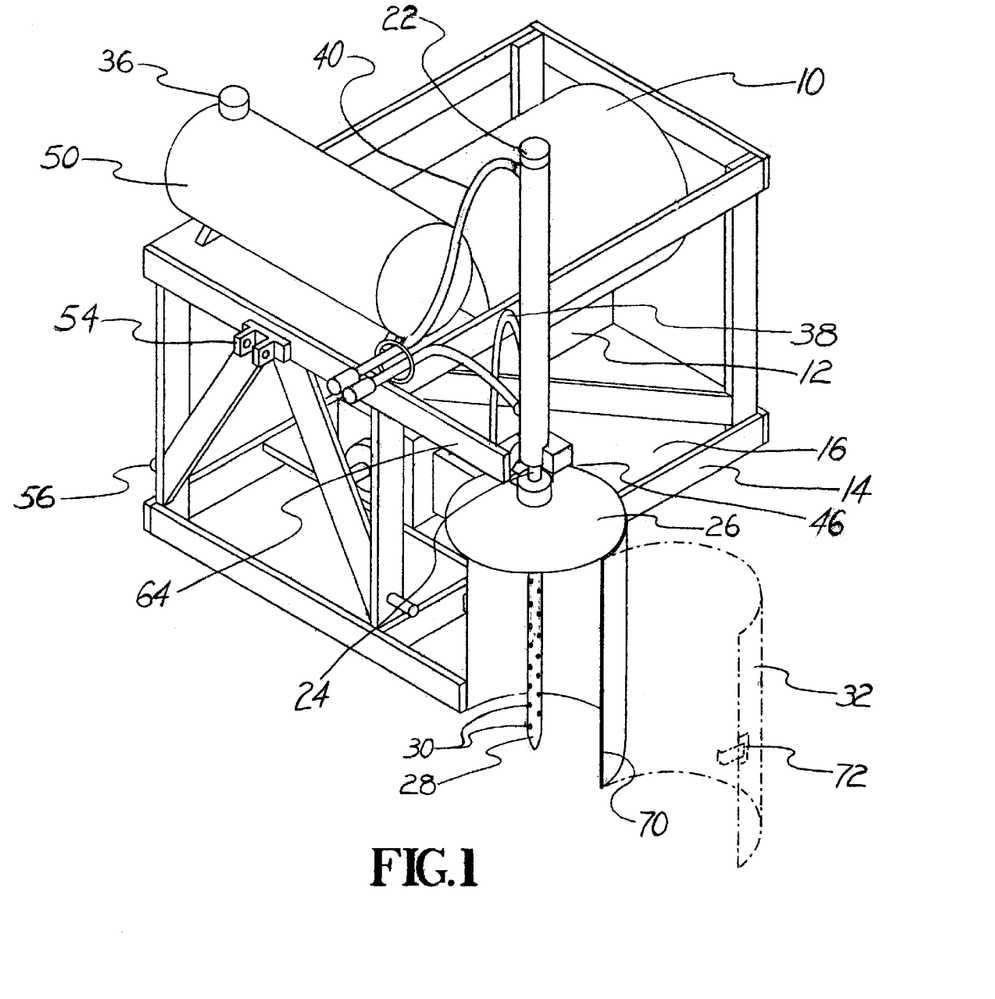
FIG. 1 is an isometric view, showing the proposed invention incorporated in a mounting frame.

A typical embodiment of the invention is illustrated in FIG. 1. Mounting frame 14 is provided to hold the various components in the correct positions, and to facilitate the lifting and transportation of the device. On the front portion of mounting frame 14 are two lift pins 56 and top link bracket 54, which allow mounting frame 14 to be attached to the rear of a tractor (detailed later).

Figure 2:
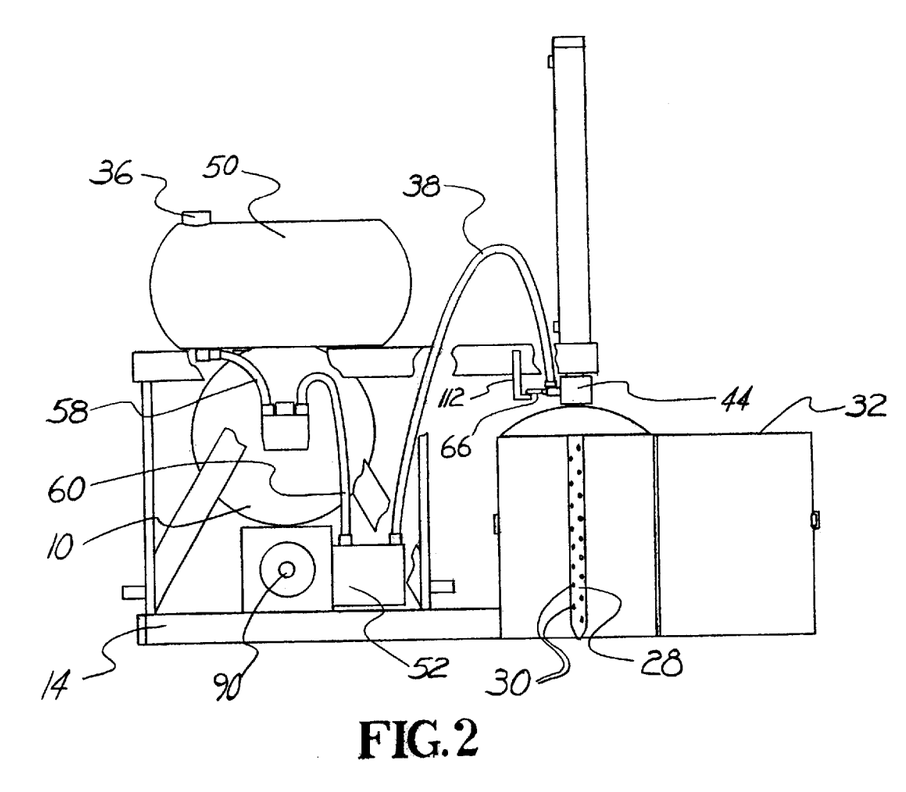
FIG. 2 is a front elevation view with cutaways, showing how the components are connected.

Water tank 50 is mounted near the top of mounting frame 14. Steam generator 10 is fixed in the middle of mounting frame 14. Fuel tank 12 is positioned near steam generator 10 to supply fuel for the internal combustor in steam generator 10. Turning to FIG. 2, water feed tube 58 is provided to connect water tank 50 to steam generator 10. Pump 52 is located near the bottom of mounting frame 14. Pump inlet tube 60 is provided to carry water from steam generator 10 to pump 52.

Returning to FIG. 1, cylinder support arm 64 is attached to the upper portion of the front of mounting frame 14. Hydraulic cylinder 22 is attached to the outer end of cylinder support arm 64 by cylinder mounting bracket 46. Steam shroud 32 is attached to the lower portion of mounting frame 14. Probe 28 and dome 26 are attached to cylinder rod 24 of hydraulic cylinder 22, so that when cylinder rod 24 extends and retracts, probe 28 and dome 26 move with it. Steam shroud 32 is cylindrical, having a diameter slightly larger than dome 26, in order to allow for clearance during the upward and downward travel of dome 26. Steam shroud 32 is split into two halves connected by hinge 70. The forward portion of steam shroud 26 may be swung open as shown in FIG. 1. When in the closed position, the moving portion of steam shroud 26 is secured by latch 72.

Figure 3:
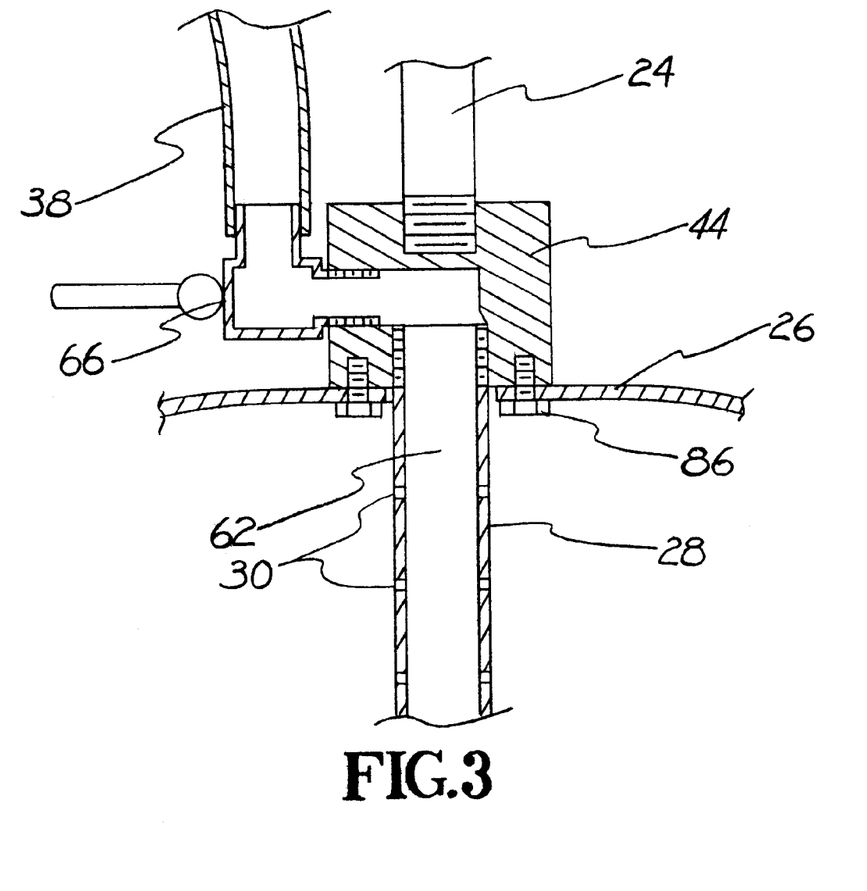
FIG. 3 is a section view, showing the internal features of the probe and the details of how the probe is secured to a hydraulic cylinder.

FIG. 3 is a sectional view showing how cylinder rod 24 attaches to probe coupling 44. Hydraulic cylinder 22 has cylinder rod 24, which extends and retracts by the application of hydraulic pressure. Probe coupling 44 is attached to the end of cylinder rod 24. Probe 28 is attached to probe coupling 44, and thereby attached to cylinder rod 24. Dome 26 is also attached to probe coupling 44. Therefore, as cylinder rod 24 extends and retracts from hydraulic cylinder 22, probe coupling 44, probe 28, and dome 26, all move as one unit.

Probe 28 is open at its upper end, so that fluid can pass from the open interior of probe coupling 44 into cavity 62, extending along the length of probe 28. Central cavity 62 is connected to the surrounding space by a plurality of steam/water orifices 30. Pump outlet tube 38 is connected to probe coupling 44 by trip valve 66.

Returning to FIG. 2, pump outlet tube 38 is provided to carry pressurized water from pump 52 to trip valve 66 on probe coupling 44. Returning to FIG. 1, hydraulic lines 40 provide hydraulic pressure to hydraulic cylinder 22 in order to extend and retract probe 28.

Figure 4:
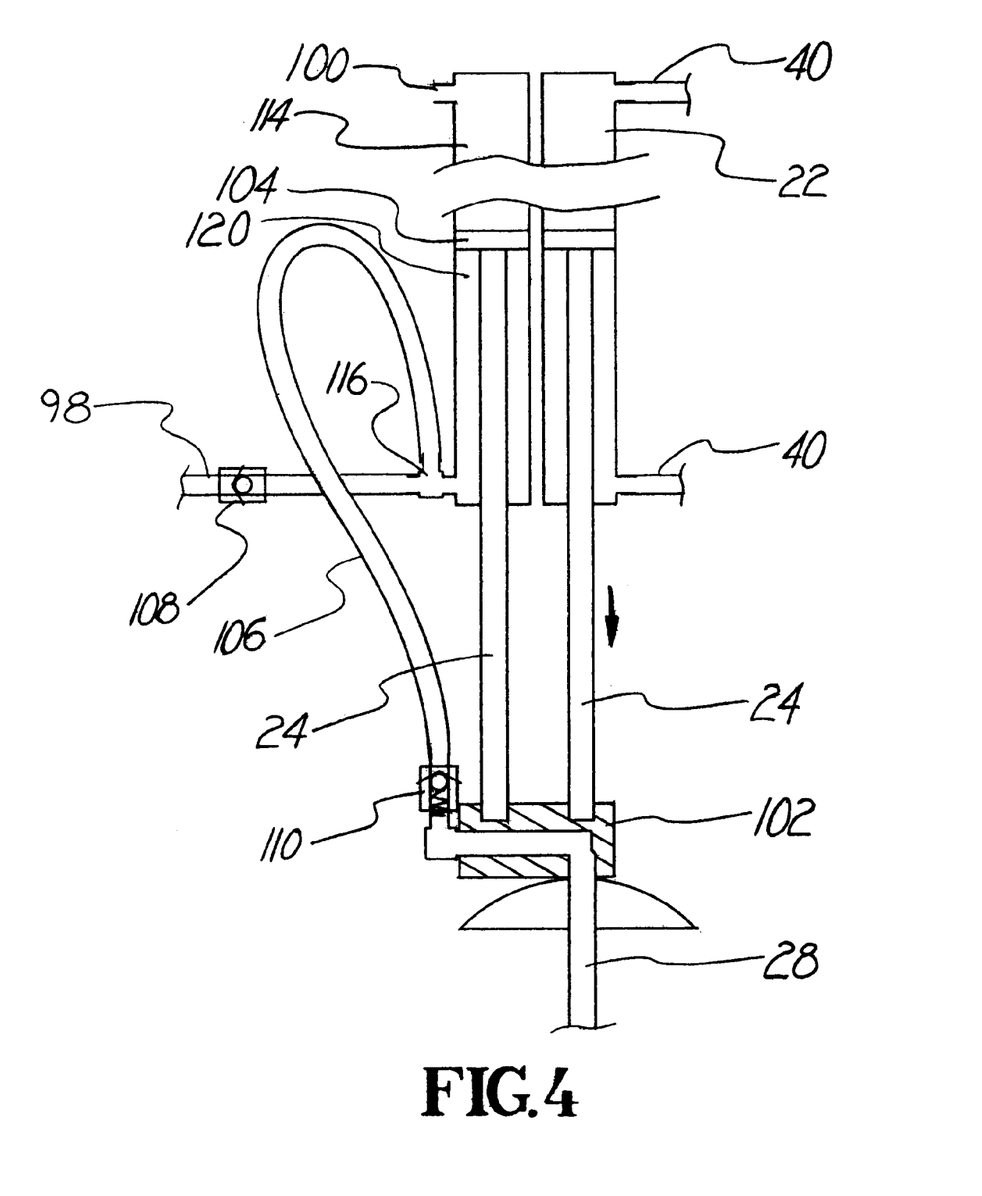
FIG. 4 is a section view, showing an alternate embodiment of the invention.
Figure 5:
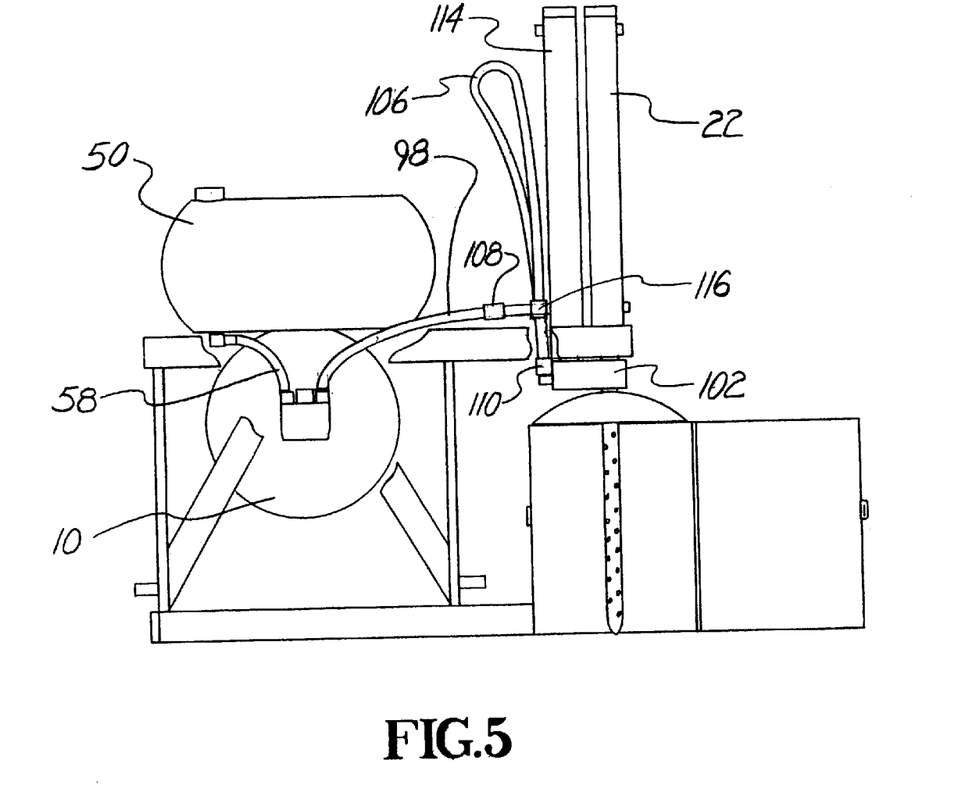
FIG. 5 is a front elevation view with cutaways, showing how the components are connected in the alternate embodiment.

FIG. 4 illustrates an alternate embodiment of the invention. In the original embodiment, pump 52 is used to pressurize the hot water. Pump 52 is expensive, and so it is desirable to replace it with a lower cost component. In the alternate embodiment, pump 52 is replaced by pump cylinder 114. Also added are check valve 108 and shut-off valve 110. Alternate coupling 102 is used to join the two cylinder rods 24 of hydraulic cylinder 22 and pump cylinder 114. FIG. 5 shows how pump cylinder 114 is rigidly mounting immediately adjacent to hydraulic cylinder 22. The operation of the alternate embodiment will be detailed in the "operation" section to follow.

Figure 6:
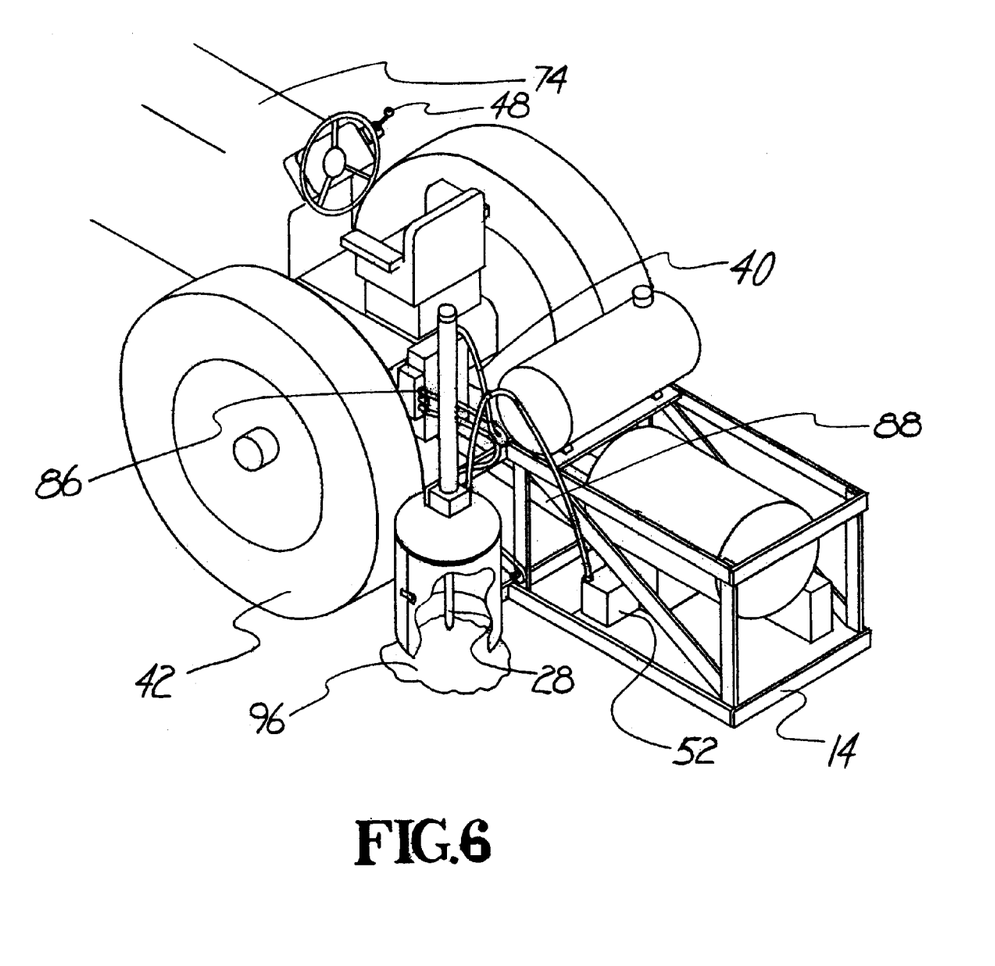
FIG. 6 is an isometric view, showing how the invention may be attached to the rear of an tractor.

FIG. 6 shows the proposed invention attached to the rear of tractor 74. The three-point hitch of tractor 74 is used to engage lift pins 56 and top link bracket 54 (shown in FIG. 1) in a conventional fashion, thereby lifting the invention off the ground and allowing it to be transported.

Figure 7:
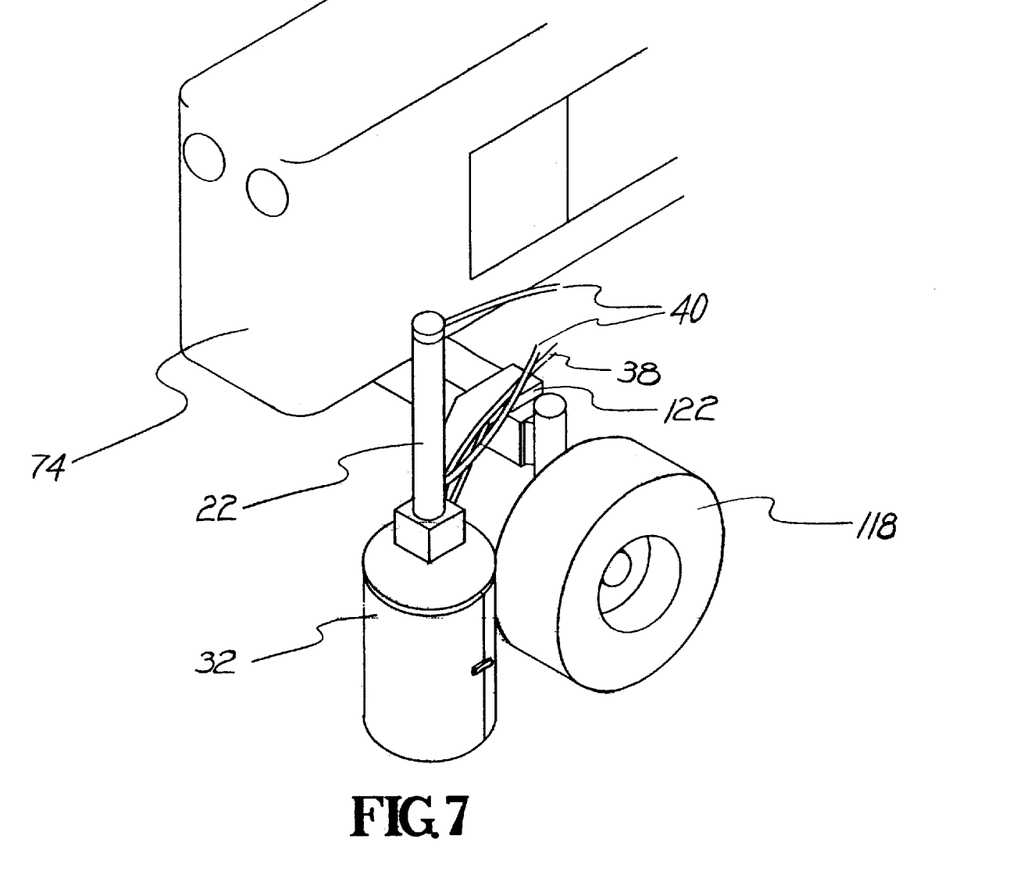
FIG. 7 is an isometric view, showing another alternate embodiment of the invention.

FIG. 7 illustrates a second alternate embodiment. With the invention mounted on the rear of the tractor, the operator must often turn his head to observe the positioning of probe 28 over an ant mound. In FIG. 7, hydraulic cylinder 22 is mounted near the front of tractor 74, immediately in front of front wheel 118. Thus, the operator can easily observe the positioning of probe 28 over an ant mound without having to turn his head.

OPERATION—FIGS. 1 through 7

The operator must first attach the invention to an agricultural tractor. Referring to FIG. 6, the operator backs tractor 74 to a position directly in front of mounting frame 14. The operator then uses the three point hitch to engage lift pins 56 and top link bracket 54 (illustrated in FIG. 1), thereby securing mounting frame 14 to tractor 74.

In order to provide hydraulic power to hydraulic cylinder 22, the operator next connects hydraulic lines 40 to hydraulic couplings 86 on the rear of tractor 74. In order to provide rotational power to pump 52, the operator attaches PTO shaft 88, which is powered by tractor 74, to pump input shaft 90 (illustrated in FIG. 2). The operator is thereby able to raise and transport the invention, to use the hydraulic power of tractor 74 to actuate hydraulic cylinder 22, and to use the rotational power of PTO shaft 88 to actuate pump 52.

The reader may gain an initial understanding of the device by following the path the water takes through it. Turning to FIG. 2, water tank 50 is fixed on the top of mounting frame 14. It is filled with water from any convenient source through water inlet 36. Water is fed by gravity from water tank 50 through water feed tube 58 into steam generator 10. Steam generator 10 pressurizes and heats the water. The heated and pressurized water exits steam generator 10 through pump inlet tube 60, which takes the water to the input side of pump 52. Pump 52 further pressurizes the water and discharges it on the output side through pump outlet tube 38. Pump outlet tube 38 carries the pressurized water to trip valve 66. When hydraulic cylinder 22 is actuated and begins thrusting probe 28 downward, the actuating lever on trip valve 66 is tripped by trip bracket 112, allowing the hot pressurized water to flow into probe coupling 44, down into probe 28, and out through a plurality of steam/water orifices 30.

As the hot pressurized water passes through the steam orifices 30, a portion of it flashes to steam. The result is a jet of hot steam and hot liquid water emitting from each steam/water orifice 30. Thus, the device takes water at ambient temperature, heats and pressurizes it, and forces it out through a plurality of steam/water orifices 30 on probe 28. The best results are obtained by heating the water to a temperature above 150 degrees Fahrenheit, and pressurizing the water to a pressure above 500 pounds per square inch.

FIG. 6 will be used to illustrate how an operator destroys an ant mound. First, the operator engages PTO shaft 88 to provide rotational power to pump 52, thereby pressurizing the system. The operator then drives tractor 74 toward an ant mound and runs over the mound with rear tractor wheel 42. Hydraulic cylinder 22 is positioned in alignment with rear tractor wheel 42. The operator then stops tractor 74 with probe 28 positioned directly over the center of ant mound 96. The operator next hits control lever 48 which provides hydraulic pressure to hydraulic cylinder 22. Cylinder rod 24 is thrust downward, carrying dome 26 and probe 28 with it. The downward motion causes trip valve 66 to open, which allows the hot pressurized water to rush into probe 28. As probe 28 is thrust into ant mound 96, jets of hot steam and water are emitted from steam/water orifices 30, scalding and killing the ants. Steam shroud 32, in combination with dome 26 (both labeled in FIG. 1), prevents the hot water and steam from escaping the immediate vicinity of ant mound 96. Probe 28 is thrust deep enough within ant mound 96 to reach and destroy the queen.

After several seconds, the operator reverses control lever 48, which raises probe 28. When probe 28 returns to its original position, trip bracket 112 closes trip valve 66, cutting off the hot pressurized water and completing the cycle. The operator then proceeds to the next mound, where these steps are repeated.

FIG. 5 illustrates an alternate embodiment of the invention, in which pump 52 is replaced by pump cylinder 114. Water is fed from water tank 50 into steam generator 10, as in the original embodiment. Hot pressurized water leaves steam generator 10 through cylinder input tube 98. Check valve 108 is placed in cylinder input tube 98 (its function will be described in the following). After passing through check valve 108, the water flows into tee coupling 116 on pump cylinder 114. Tee coupling 116 allows the water to flow either into pump cylinder 114 or into cylinder output tube 106. The purpose of tee coupling 116 will be explained shortly.

Turning to FIG. 4, the reader will observe that cylinder rods 24 of hydraulic cylinder 22 and pump cylinder 114 are joined by alternate coupling 102. Thus, when hydraulic pressure is applied to move cylinder 24 in hydraulic cylinder 22, piston 104 is also moved within pump cylinder 114. FIG. 4 shows the assembly in the middle of a downward stroke by hydraulic cylinder 22, as shown by the arrow. Hot water 120 in pump cylinder 114 is greatly pressurized by the descending motion of piston 104. Hot water 120 is forced out through tee coupling 116. The pressure causes check valve 108 to close, thereby shutting off the return of hot water 120 through cylinder input tube 98. Since hot water 120 has nowhere else to go, it is forced into cylinder output tube 106. Hot water 120 then flows down to shut-off valve 110. The pressure causes shut-off valve 110 to open, thereby allowing hot water 120 to flow down into probe 28. Hot water 120 continues to flow in this fashion until hydraulic cylinder 22 reaches the most downward extent of its stroke, corresponding to probe 28 being fully plunged into an ant mound. At that point, the motion of hydraulic cylinder 22 is reversed, and the second portion of the cycle commences.

As cylinder rods 24 move upward, the corresponding upward motion of piston 104 creates a vacuum within the lower portion of pump cylinder 114, and cylinder output tube 106, which is connected thereto. This vacuum causes shut-off valve 110 to close, preventing the suction of air back through probe 28. The vacuum also causes check valve 108 to open, which allows hot water 120 to be drawn in from steam generator 10 through cylinder input tube 98. When hydraulic cylinder 22 reaches its fully retracted position, pump cylinder 114 is fully loaded with hot water 120, and a new extension cycle is ready to begin. Thus, cylinder pump 114 acts like a large syringe, drawing hot water from steam generator 10 and forcing it down into probe 28 in a metered charge. The reader will appreciate that pump cylinder 114 and the various water lines described should be insulated to minimize heat loss. In the interest of clarity, the insulation has not been illustrated in the drawings.

FIG. 7 illustrates a second alternate embodiment of the invention. When the proposed invention is mounted on the rear of a tractor, the operator must continually turn his head to observe its position, promoting operator fatigue. The second alternate embodiment seeks to remedy this problem. Front bracket 122 is used to mount hydraulic cylinder 22 close in front of front wheel 118 on tractor 74. In this embodiment, the operator can observe the positioning of hydraulic cylinder 22, along with the associated probe 28, over the top of an ant mound without having to turn his head. Hydraulic lines 40 run back along the side of tractor 74 and are connected in the same manner as in the original invention. Likewise, pump outlet tube 38 runs back along the side of the tractor and connects to pump 52.

Returning to FIG. 6, the reader will appreciate that when the invention is full of water, it places a substantial load on the rear of tractor 74. In order to minimize frequent refilling of water tank 50, it may be desirable to make water tank 50 very large. To do so would obviously make the device considerably heavier. In such a circumstance, it would be desirable to add a supporting wheel to the rear of mounting frame 14, similar to the type of wheel found on tractor mowers. As this addition is commonly encountered in the prior art, and no claim is being made for it, it has not been illustrated. However, one contemplating construction of a very large version of the invention should consider the addition of a rear supporting wheel.

SUMMARY, RAMIFICATIONS, AND SCOPE

Accordingly, the reader will appreciate that the proposed invention gives the user the ability to rapidly destroy a series of fire ant mounds. It also has the following advantageous features:

(1) It may be mounted on the rear of an agricultural tractor and transported using the tractor's standard features.
(2) It may be powered using the standard PTO shaft and hydraulic couplings of an agricultural tractor.
(3) It uses a hydraulic cylinder to ram a probe deep into an ant mound, thereby delivering the hot steam and water deep enough to reach and kill the queen.
(4) The operation cycle is very rapid, giving the ants insufficient time to remove the queen to safety.

(5) It is capable of destroying a substantial number of ant mounds without adding water and/or refueling.

(6) It requires little manual effort on the part of the operator.

(7) It does not require the operator to approach the ant mound on foot, thereby exposing him to the risk of attack.

Although the preceding description contains significant detailed information, it should not be construed as limiting the scope of the invention, but rather as providing illustrations of some of the preferred embodiments of the invention. For example, even though the invention was shown attached to the rear of an agricultural tractor, it could be easily adopted to mount on a front end loader. Power for the pump could be provided by a separate engine rather than a PTO shaft. The hydraulic cylinder could be replaced by an electric gear motor or any other means of mechanical actuation. Likewise, the invention could be reconfigured as a self-propelled stand alone vehicle, so that an agricultural tractor would not be necessary. All of these changes could be made without altering the basic nature of the invention. Thus, the scope of the invention should be fixed by the following claims, rather than by the examples given.

Having described the invention, what is claimed is:

1. An apparatus for killing South American fire ants comprising:
   a. a steam generator for heating water;
   b. a pump for pressurizing water, said pump being connected to said steam generator in order to allow water flow from said steam generator to said pump;
   c. a probe, being substantially in the shape of a long and slender rod, with its long axis oriented vertically, having an interior cavity in fluid connection with said pump, with the outside surface of said probe opening into said interior cavity through a plurality of orifices situated along its length, whereby hot pressurized water escapes to the outside of said probe through said orifices; and
   d. a hydraulic cylinder coupled to said probe, with the long axis of said hydraulic cylinder being oriented vertically, and being aligned with said long axis of said probe, with said hydraulic cylinder being capable of ramming said probe downward into an ant mound to a depth of at least three feet, so that the hot pressurized water escaping through said orifices is injected directly into said ant mound.

2. An apparatus as in claim 1, wherein all components are mounted on a mounting frame adapted to be mounted on and transported by an agricultural tractor.

3. An apparatus as in claim 2, wherein hydraulic power to said hydraulic cylinder is provided by the hydraulic pump on an agricultural tractor.

4. An apparatus as in claim 2, wherein rotational power to said pump is provided by the PTO output shaft on an agricultural tractor.

5. An apparatus for killing South American fire ants comprising:
   a. a steam generator for heating water;
   b. a pump cylinder, having an extendable and retractable cylinder rod, said pump cylinder being fluidly connected to said steam generator in order to allow water flow from said steam generator to said pump cylinder;
   c. a hydraulic cylinder, having an extendable and retractable cylinder rod rigidly connected to said cylinder rod of said pump cylinder; and
   d. a probe rigidly connected to said cylinder rod of said hydraulic cylinder, having an interior cavity in fluid connection with said pump cylinder, with the outside surface of said probe opening into said interior cavity through a plurality of orifices situated along its length, whereby hot water pressurized by said pump cylinder escapes to the outside of said probe through said orifices as said cylinder rod of said hydraulic cylinder extends to ram said probe down into an ant mound.

6. An apparatus as in claim 5, wherein all components are mounted on a mounting frame adapted to be mounted on and transported by an agricultural tractor.

7. An apparatus as in claim 6, wherein hydraulic power to said hydraulic cylinder is provided by the hydraulic pump on an agricultural tractor.

* * * * *